(12) United States Patent
Simpson et al.

(10) Patent No.: US 10,908,128 B2
(45) Date of Patent: Feb. 2, 2021

(54) APPARATUS FOR AN INSPECTION DEVICE

(71) Applicant: Astec, Inc., Chattanooga, TN (US)

(72) Inventors: Charles Simpson, Soddy Daisy, TN (US); John Watson, Red Bank, TN (US); Albert Covington, Cleveland, TN (US); Kris Robertson, Chickamauga, GA (US)

(73) Assignee: Astec, Inc., Chattanooga, TN (US)

( * ) Notice: Subject to any disclaimer, the term of this patent is extended or adjusted under 35 U.S.C. 154(b) by 233 days.

(21) Appl. No.: 16/135,117

(22) Filed: Sep. 19, 2018

(65) Prior Publication Data

US 2019/0017970 A1   Jan. 17, 2019

Related U.S. Application Data

(63) Continuation-in-part of application No. 15/425,605, filed on Feb. 6, 2017, now abandoned, which is a
(Continued)

(51) Int. Cl.
| | |
|---|---|
| *G01N 29/22* | (2006.01) |
| *G01N 29/04* | (2006.01) |
| *G01N 29/28* | (2006.01) |
| *G01N 29/265* | (2006.01) |
| *G05D 1/00* | (2006.01) |

(52) U.S. Cl.
CPC ......... *G01N 29/226* (2013.01); *G01N 29/041* (2013.01); *G01N 29/265* (2013.01); *G01N 29/28* (2013.01); *G05D 1/0038* (2013.01); *G01N 2291/0234* (2013.01); *G01N 2291/02854* (2013.01); *G01N 2291/2636* (2013.01); *G05D 2201/0207* (2013.01)

(58) Field of Classification Search
CPC .. G01N 29/226; G01N 29/041; G01N 29/265; G01N 29/28; G01N 2291/0234; G01N 2291/02854; G01N 2291/2636; G05D 1/0038; G05D 2201/0207
USPC .......................................................... 701/2
See application file for complete search history.

(56) References Cited

U.S. PATENT DOCUMENTS 8,160,747 B1   4/2012 Blackwell et al.
9,908,239 B1 *  3/2018 O'Brien ............... G05D 1/0282
(Continued)

*Primary Examiner* — Paula L Schneider
(74) *Attorney, Agent, or Firm* — Chambliss, Bahner & Stophel, P.C.; Stephen D. Adams

(57) ABSTRACT

An inspection device for inspecting storage silos having mobile body with a tray portion for holding internal components for powering and controlling the inspection device, such as a control circuit and power source. Pairs of spaced apart in-line drive wheels are mounted to the tray portion. An external equipment mounting location (space) is provided between the pairs of drive wheels. A universal wiring harness is located within the tray portion and extends to the external mounting location such that at least two non-identical items of inspection equipment can be interchangeably mounted to the mobile body and connected to the wiring harness. A top portion may be secured over the tray portion to enclose the internal components. Optional fenders may be secured over the wheels and external equipment. Preferably, the external equipment can be swapped without having to remove the top portion from the tray portion.

20 Claims, 17 Drawing Sheets

Related U.S. Application Data continuation-in-part of application No. 15/074,283, filed on Mar. 18, 2016, now abandoned.

(60) Provisional application No. 62/134,860, filed on Mar. 18, 2015.

(56) References Cited

U.S. PATENT DOCUMENTS

| | | |
|---|---|---|
| 2015/0148949 A1 | 5/2015 | Chin et al. |
| 2015/0153312 A1 | 6/2015 | Gonzalez et al. |
| 2016/0207202 A1* | 7/2016 | Lee .................. B25J 15/0057 |
| 2016/0250753 A1* | 9/2016 | Yoshizawa ............ B25J 15/04 700/258 |
| 2019/0184562 A1* | 6/2019 | Yamada ................ B25J 15/04 |

* cited by examiner

FIGURE 1
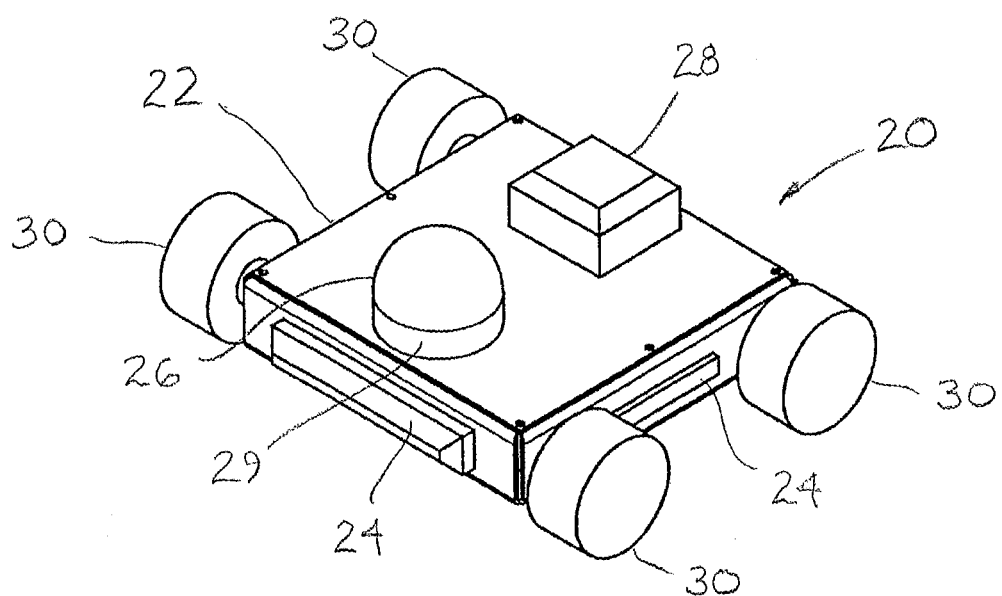
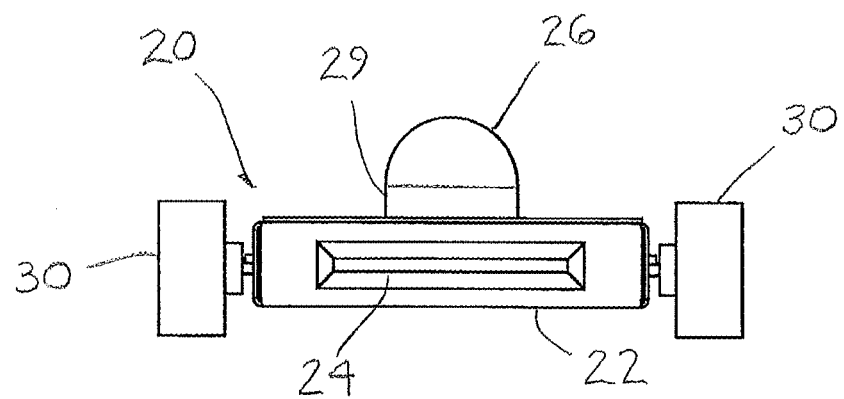
FIGURE 2

FIGURE 3
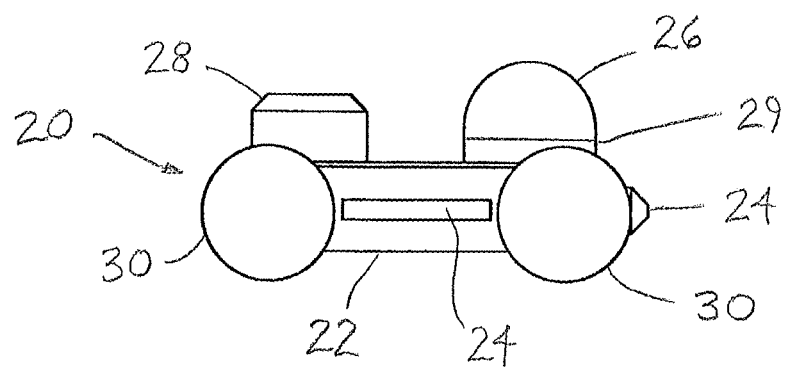
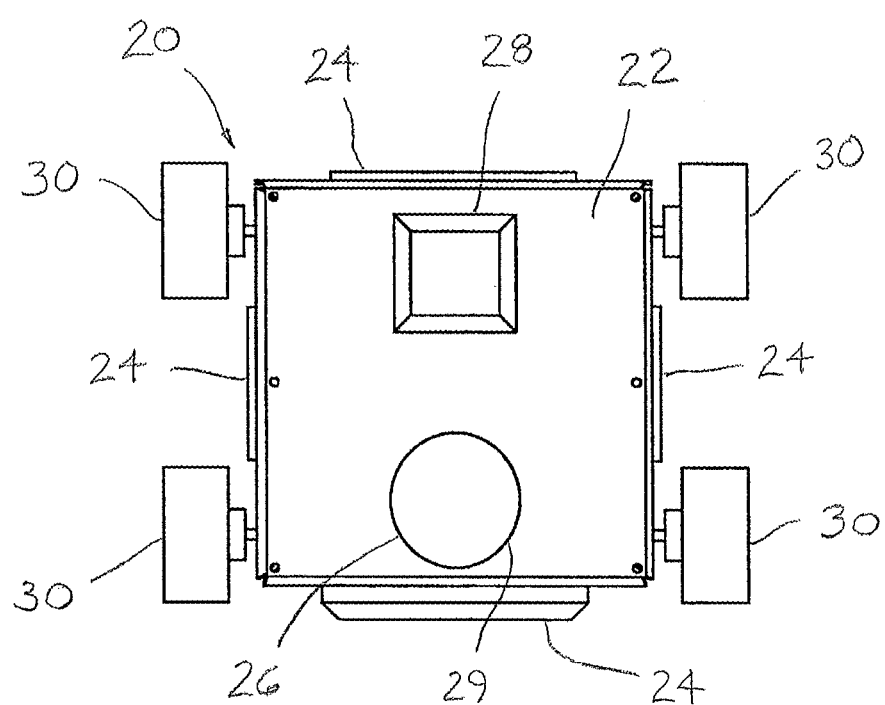
FIGURE 4

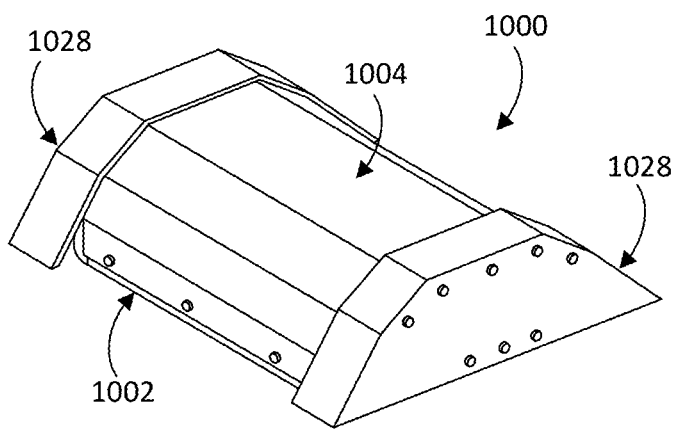
*FIGURE 14*
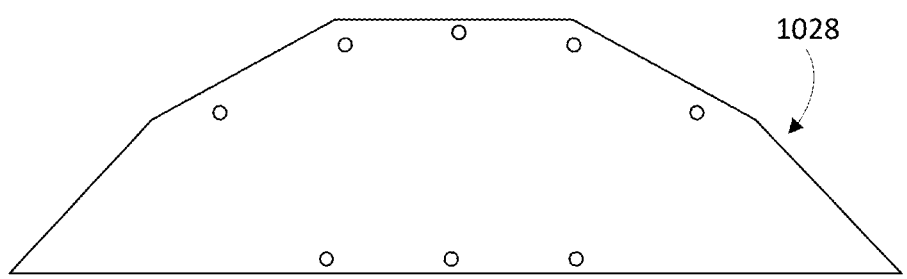
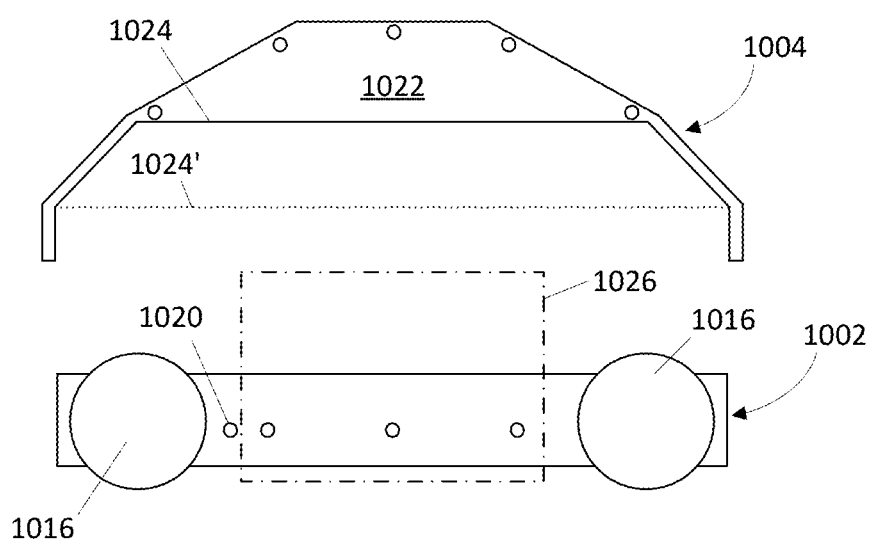
*FIGURE 15*

APPARATUS FOR AN INSPECTION DEVICE

CROSS-REFERENCE TO RELATED APPLICATIONS

This application is a continuation-in-part of U.S. patent application Ser. No. 15/425,605, entitled "Apparatus and Method for an Inspection Device" and filed Feb. 6, 2017, which is a continuation-in-part of U.S. patent application Ser. No. 15/074,283 entitled "Apparatus and Method for an Inspection Device" and filed Mar. 18, 2016, which claims the benefit of U.S. Provisional Patent Application Ser. No. 62/134,860 entitled "Mobile Robot" and filed on Mar. 18, 2015. Each of the foregoing applications are incorporated herein by reference in their entireties.

FIELD OF THE INVENTION

The present invention relates generally to inspection devices and methods, and particularly to a mobile, wirelessly-controlled inspection device and method for inspecting storage devices such as silos.

BACKGROUND OF THE INVENTION

It is known to use various devices and methods to inspect silos. Conventional devices and methods, however, suffer from one or more disadvantages. For example, conventional devices and methods require an inspector to be at the site of the inspection. Conventional devices and methods also require scaffolding or other similar equipment. Conventional devices and methods are undesirably expensive, labor-intensive, and time-consuming. In addition, conventional devices and methods expose the inspector to undesirable safety risks. Conventional devices and methods further require excessive training and produce less than optimal inspection results.

It would be desirable, therefore, if an apparatus and method for an inspection device could be provided that would not require an inspector to be at the site of the inspection. It would also be desirable if such an apparatus and method for an inspection device could be provided that would not require scaffolding or other similar equipment. It would be further desirable if such an apparatus and method for an inspection device could be provided that would be less expensive, labor-intensive, and time-consuming. It would be still further desirable if such an apparatus and method for an inspection device could be provided that would minimize or eliminate safety risks to the inspector. It would also be desirable if such an apparatus and method for an inspection device could be provided that would reduce the required amount of training and produce improved inspection results.

Advantages of a Preferred Embodiment of the Invention

Accordingly, it is an advantage of the preferred embodiments of the invention claimed herein to provide an apparatus and method for an inspection device that does not require an inspector to be at the site of the inspection. It is also an advantage of the preferred embodiments of the invention claimed herein to provide an apparatus and method for an inspection device that does not require scaffolding or other similar equipment. It is another advantage of the preferred embodiments of the invention claimed herein to provide an apparatus and method for an inspection device that is less expensive, labor-intensive, and time-consuming. It is an advantage of the preferred embodiments of the invention claimed herein to provide an apparatus and method for an inspection device that reduces or eliminates safety risks to the inspector. It is also an advantage of the preferred embodiments of the invention claimed herein to provide an apparatus and method for an inspection device that reduces the required amount of training and produces improved inspection results.

Additional advantages of the preferred embodiments of the invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY OF THE INVENTION

The above and other needs are met by an inspection device for inspecting storage silos. The inspection device includes a mobile body having a tray portion and an equipment mounting location disposed on an exterior surface of the mobile body. The equipment mounting location is sized and configured to enable at item of inspection equipment to be removably mounted to the mobile body. That equipment may be accessed and exchanged with another item of inspection equipment from outside the mobile body without requiring access inside of the mobile body. A power source is located within the mobile body and supplies power to the mobile body and to the item of inspection equipment mounted to the equipment mounting location. Likewise, a control circuit is located within the mobile body for at least partially controlling movement of the mobile body and operating the item of inspection equipment. In some cases, the mobile body may be controlled remotely.

A wiring harness is located within the tray portion and is configured to connect with the item of inspection equipment outside of the mobile body. The wiring harness is operable to form an electrical circuit comprising the inspection equipment mounted to the mobile body at the equipment mounting location, the control circuit, and the power source. Preferably, the equipment mounting location is configured to allow at least two non-identical items of inspection equipment to be interchangeably and removably mounted to the mobile body. In those cases, the wiring harness is preferably a universal wiring harness that interchangeably connects with each of the least two non-identical items of inspection equipment.

The inspection device includes pairs of spaced apart in-line drive wheels that are located on left and right sides of the tray portion of the mobile body. Preferably, each drive wheel may be driven independently of every other drive wheel. In certain cases, the equipment mounting location is provided in a space located between a pair of in-line drive wheels. In certain cases, the tray portion includes a side wall that forms an enclosure for the tray portion. The enclosure has left, right, front and back vertical surfaces and an open top. In those cases, the equipment mounting location may be located on the left vertical surface or the right vertical surface of the wall.

In certain preferred embodiments, the mobile device includes a top portion that is configured to removably mount to and to extend over the tray portion. Further, a fender may be configured to removably mount to and to extend laterally outwards from a left side or a right side of the top portion and over the inspection equipment mounted to the tray portion at the equipment mounting location. According to certain embodiments, the fender is configured to removably mount to the equipment mounted to the tray portion at the equipment mounting location. In some cases, a top end of the fender is mounted to the top portion and a bottom end of the fender is mounted to the equipment mounted to the tray portion at the equipment mounting location. In certain cases, pairs of spaced apart in-line drive wheels are disposed on left and right sides of the body portion. Additionally, wheel cutouts are formed in the fender and are located proximate to and are approximately equal in size to the drive wheels.

In certain embodiments, the fender and the equipment mounted to the tray portion at the equipment mounting location may be removed as a unit without removing the top portion from the tray portion. In certain embodiments, the fender, the top portion, and the equipment may be removed, as a single unit, from the tray portion.

In certain preferred embodiments, one or more equipment bays are formed in the top portion. Each equipment bay is configured to receive a hot swappable piece of equipment. The hot swappable piece of equipment may include, for example, a power source.

BRIEF DESCRIPTION OF THE DRAWINGS

The presently preferred embodiments of the invention are illustrated in the accompanying drawings, in which like reference numerals represent like parts throughout, and in which:

FIG. 1 is a front perspective view of the preferred embodiment of the inspection device in accordance with the present invention;

FIG. 2 is a front view of the preferred inspection device illustrated in FIG. 1;

FIG. 3 is a left side view of the preferred inspection device illustrated in FIGS. 1-2;

FIG. 4 is a top view of the preferred inspection device illustrated in FIGS. 1-3;

FIG. 14 is a perspective view of the top portion and tray portion of FIG. 12 after being fully assembled with protective covers (fenders);

FIG. 15 is a side elevation view depicting the tray portion, top portion, and removable cover shown in FIGS. 12-14;

DESCRIPTION OF THE PREFERRED EMBODIMENTS OF THE INVENTION

Figure 5:
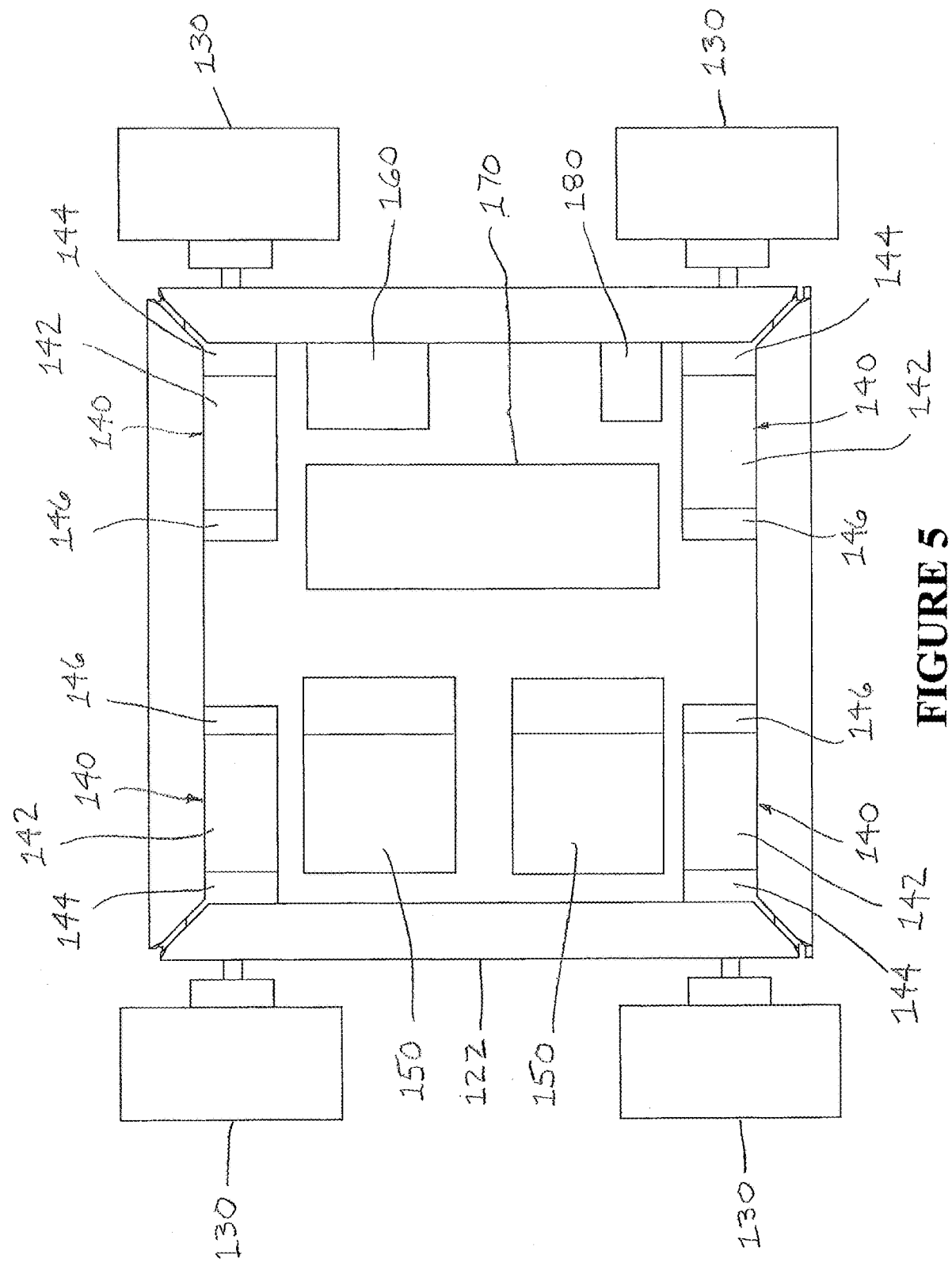
FIG. 5 is a partial sectional top view of a first alternative embodiment of the inspection device in accordance with the present invention.
Figure 6:
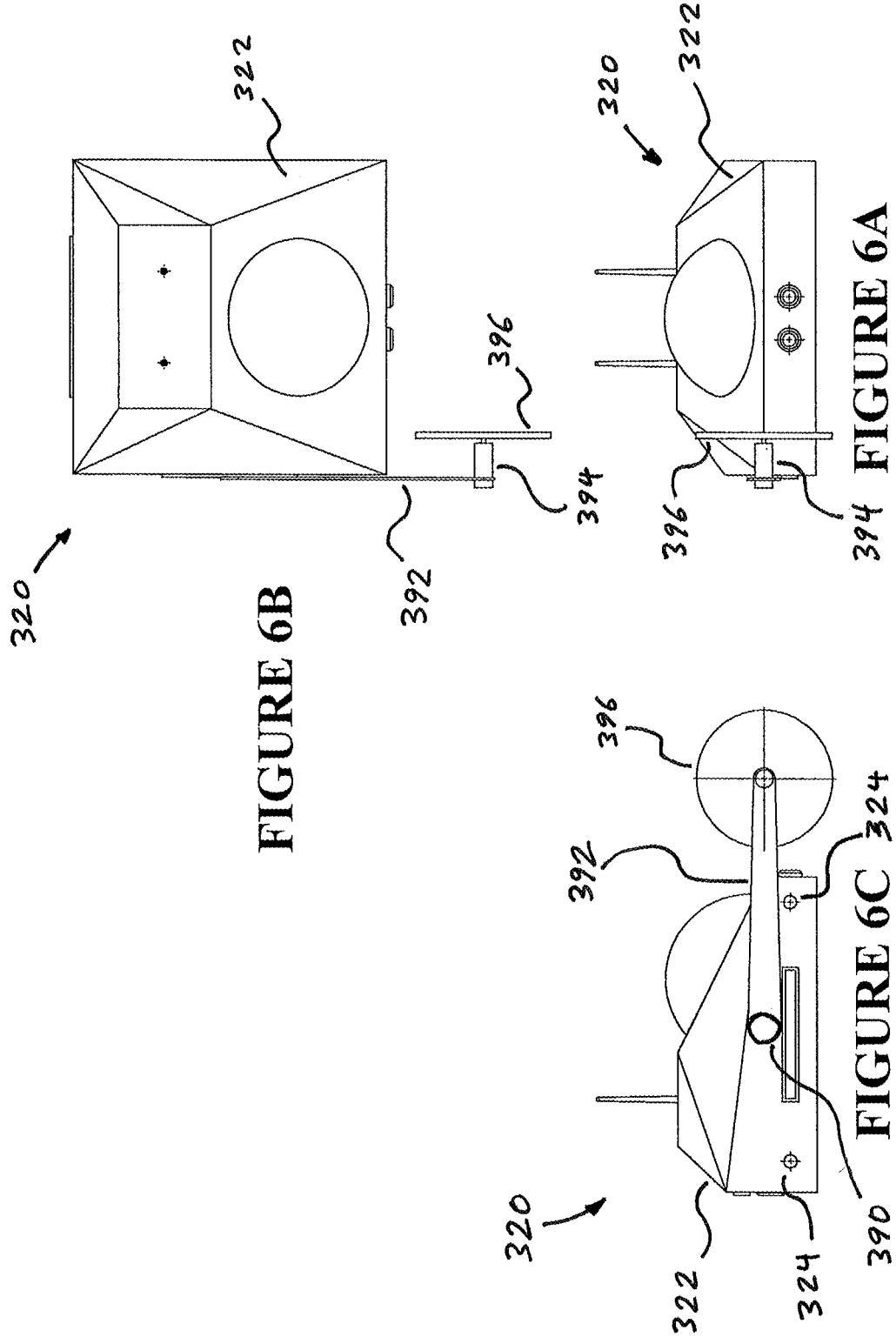
FIG. 6A is a front view of a second alternative embodiment of the inspection device in accordance with the present invention.
FIG. 6B is a top view of the second alternative embodiment of the inspection device illustrated in FIG. 6A.
FIG. 6C is a left side view of the second alternative embodiment of the inspection device illustrated in FIGS. 6A and 6B.

This description of the preferred embodiments of the invention is intended to be read in connection with the accompanying drawings, which are to be considered part of the entire written description of this invention. The drawings are not necessarily to scale, and certain features of the invention may be shown exaggerated in scale or in somewhat schematic form in the interest of clarity and conciseness.

Referring now to the drawings, the preferred embodiments of the apparatus and method for an inspection device in accordance with the present invention are illustrated by FIGS. 1 through 10. As shown in FIGS. 1-10, the preferred embodiments of the invention described and claimed herein are adapted to provide an apparatus and method for an inspection device that does not require an inspector to be at the site of the inspection. The preferred embodiments of the invention described and claimed herein are also adapted to provide an apparatus and method for an inspection device that does not require scaffolding or other similar equipment. The preferred embodiments of the invention described and claimed herein are further adapted to provide an apparatus and method for an inspection device that is less expensive, labor-intensive, and time-consuming. The preferred embodiments of the invention described and claimed herein are still further adapted to provide an apparatus and method for an inspection device that reduces or eliminates safety risks to the inspector. In addition, the preferred embodiments of the invention described and claimed herein are adapted to provide an apparatus and method for an inspection device that reduces the required amount of training and produces improved inspection results.

Referring now to FIG. 1, a front perspective view of the preferred embodiment of the inspection device in accordance with the present invention is illustrated. As shown in FIG. 1, the preferred inspection device is designated generally by reference numeral 20. Preferred inspection device 20 comprises body 22, which is adapted to receive and retain lights 24 and an item of inspection equipment such as video camera 26, a sensor such as metal thickness measuring instrument 28, and/or Infrared vision system 29. Preferred video camera is a high definition (HD) camera that is adapted to be controlled by first person view (FPV) head gear. Preferred inspection device 20 also comprises wheels 30 which are rotatably mounted to body 22. Preferably, wheels 30 are magnetic so they can adhere to the metal surface of a storage device such as a silo. It is also contemplated within the scope of the invention that the wheels may be rubber or any other suitable material adapted for ground-based inspections. While FIG. 1 illustrates the preferred configuration and arrangement of the inspection device in accordance with the present invention, it is contemplated within the scope of the invention that the inspection device may be of any suitable configuration and arrangement. It is also contemplated within the scope of the invention that the inspection device may be adapted to receive and retain any other suitable items such as extra batteries and the like.

Referring now to FIG. 2, a front view of preferred inspection device 20 is illustrated. As shown in FIG. 2, preferred inspection device 20 comprises body 22, light 24, video camera 26, Infrared vision system 29, and wheels 30.

Referring now to FIG. 3, a left side view of preferred inspection device 20 is illustrated. As shown in FIG. 3, preferred inspection device 20 comprises body 22, light 24, video camera 26, metal thickness measuring instrument 28, Infrared vision system 29, and wheels 30.

Referring now to FIG. 4, a top view of preferred inspection device 20 is illustrated. As shown in FIG. 4, preferred inspection device 20 comprises body 22, lights 24, video camera 26, metal thickness measuring instrument 28, Infrared vision system 29, and wheels 30.

Referring now to FIG. 5, a partial sectional top view of a first alternative embodiment of the inspection device in accordance with the present invention is illustrated. As shown in FIG. 5, the preferred inspection device is designated generally by reference numeral 120. Preferred inspection device 120 comprises body 122 which is adapted to receive and retain an item of inspection equipment such as a video camera, a metal thickness measuring instrument, and/or an Infrared vision system (see FIGS. 1-4). Preferred inspection device 120 also comprises wheels 130 which are rotatably mounted to body 122. Preferably, wheels 130 are magnetic so they can adhere to the metal surface of a storage device such as a silo. It is also contemplated within the scope of the invention that the wheels may be rubber or any other suitable material adapted for ground-based inspections. Preferred inspection device 120 further comprises power sources 140 which are adapted to rotate wheels 130. Preferably, power sources 140 comprise DC gear motors 142 which are adapted to be independently controlled. Preferred power sources 140 also comprise gear boxes 144 which are adapted to reduce the final drive output to facilitate increased output torque and control precision and encoders 146 which enable the motion controller to identify the exact position of the motors in relation to the longitudinal axis of the motor shaft and allows for the exact positioning of the wheels and determination of their rotational speed.

Still referring to FIG. 5, preferred inspection device 120 also comprises a pair of controllers 150 adapted to control the movement of the inspection device. Preferably, each of controllers 150 comprises a power source controller such as a solid state motor or speed controller having a metal-oxide-semiconductor field-effect transistor (MOSFET) H-Bridge circuit adapted to control the speed of each motor. In addition, each of controllers 150 also preferably comprises a motion controller such as a mixed mode motion controller and/or a speed and torque controlled motion controller. More particularly, a proportional-integral-derivative (PID) controller having microprocessor based PID circuits may be used as a fly-by-wire (FBW) system to smooth the operation of the motors. Preferably, the PID controller is adapted to add power to the motor when a load is sensed in order to maintain the constant motor RPM. The preferred PID controller is also adapted to smooth the operation of the drive system by intercepting the user's inputs and smoothing them. Preferred inspection device also comprises wireless control receiver 160 which is adapted to receive radio signals for controlling the movement of the device and transmit telemetry uplink which is a data stream including live system data such as battery voltage, current draw, altitude, temperature, ground speed, sensor data, and the like from the inspection device to a ground station. Preferred inspection device further comprises battery 170 which is adapted to provide an energy source to the device. Preferred inspection device 20 still further comprises an autonomous controller such as autopilot 180 which is controlled via packetized serial commands and allows for unmanned operation of the device. Preferred inspection device 120 is adapted to be radio controlled. While FIG. 5 illustrates the preferred configuration and arrangement of the inspection device in accordance with the present invention, it is contemplated within the scope of the invention that the inspection device may be of any suitable configuration and arrangement.

Referring now to FIGS. 6A through 6C, front, top, and left side views of a second alternative embodiment of the inspection device in accordance with the present invention are illustrated. As shown in the front view in FIG. 6A, the preferred inspection device is designated generally by reference numeral 320. Preferred inspection device 320 comprises body 322 which is adapted to receive and retain an item of inspection equipment such as a video camera, a metal thickness measuring instrument, and/or an Infrared vision system (see FIGS. 1-5). Preferred inspection device 320 also comprises wheels (not shown) which are rotatably mounted to body 322 proximate wheel axle apertures 324. Preferably, wheels are magnetic so they can adhere to the metal surface of a storage device such as a silo. It is also contemplated within the scope of the invention that the wheels may be rubber or any other suitable material adapted for ground-based inspections. In the alternative embodiment of the preferred inspection device illustrated in FIGS. 6A through 6C, inspection device 320 includes actuator 390 and actuator arm 392 extending away from body 322. Actuator arm 392 generally includes a first end proximate body 322 and a second end a certain distance from body 322. Attached to actuator arm 392 near the second end is attachment means 394 for implement 396, which preferably is a wire brush, grinding wheel, or similar instrument (referred collectively herein as "abrading" instruments). Preferably, attachment means 394 includes a motor or other component to drive implement 396.

Figure 7:
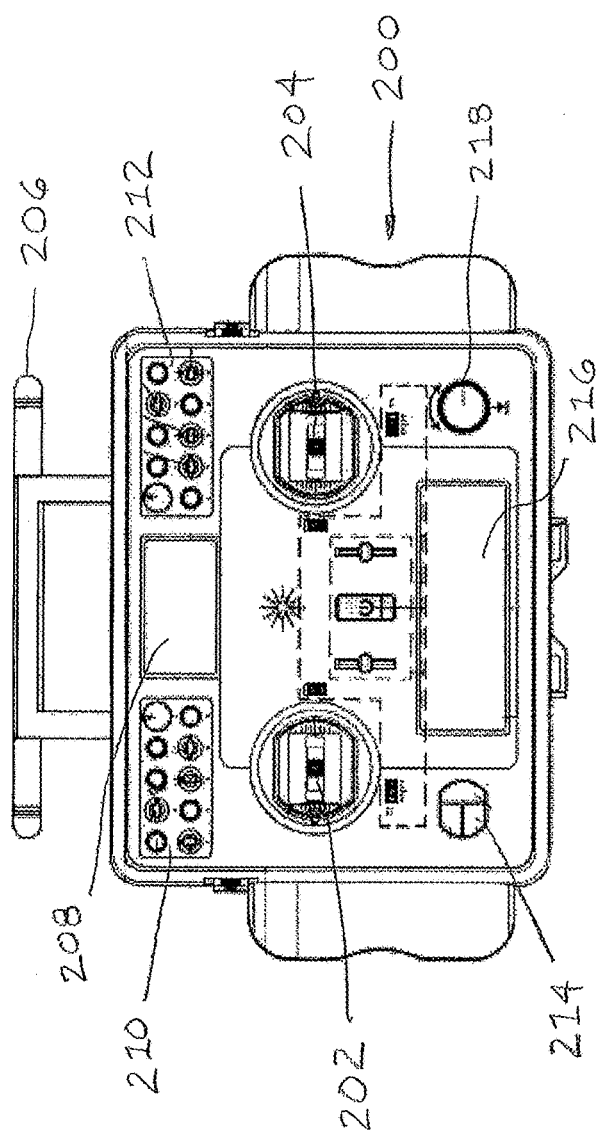
FIG. 7 is a top view of the preferred embodiment of the wireless controller in accordance with the present invention.

Referring now to FIG. 7, a top view of preferred wireless controller 200 is illustrated. As shown in FIG. 7, the preferred wireless controller is a human-controlled wireless controller and designated generally by reference numeral 200. Preferred wireless controller 200 comprises a camera control device such as camera control joystick 202, a motion control device such as motion control joystick 204, antenna 206, telemetry screen 208, a first switch panel 210, a second switch panel 212, navigation buttons 214, control screen 216, and input control knob 218.

Figure 8:
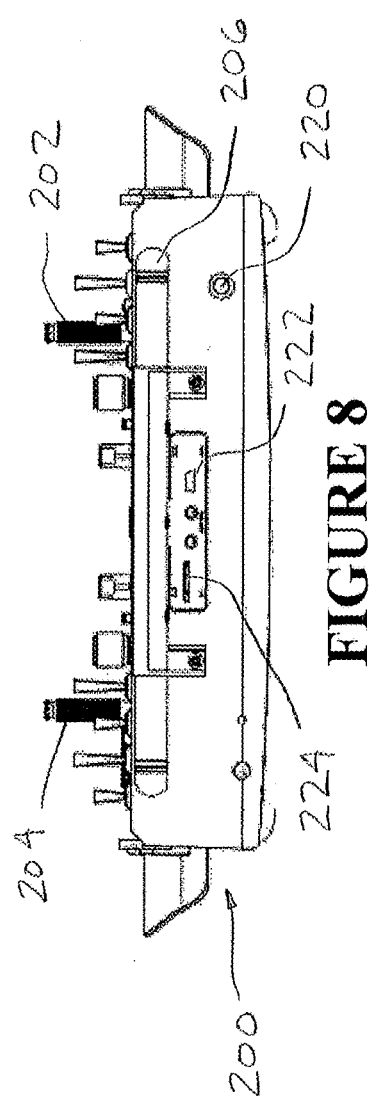
FIG. 8 is a front view of the preferred wireless controller illustrated in FIG. 7.

Referring now to FIG. 8, a front view of the preferred embodiment of the wireless controller in accordance with the present invention is illustrated. As shown in FIG. 8, preferred wireless controller 200 comprises a camera control device such as camera control joystick 202, a motion control device such as motion control joystick 204, antenna 206, recharge ports 220 and 222, and micro SD storage 224. While FIGS. 7 and 8 illustrate the preferred configuration and arrangement of the wireless controller in accordance with the present invention, it is contemplated within the scope of the invention that the wireless controller may be of any suitable configuration and arrangement. It is also contemplated within the scope of the invention that the controller may be a wired device, mechanism, assembly, or combination thereof.

Figure 9:
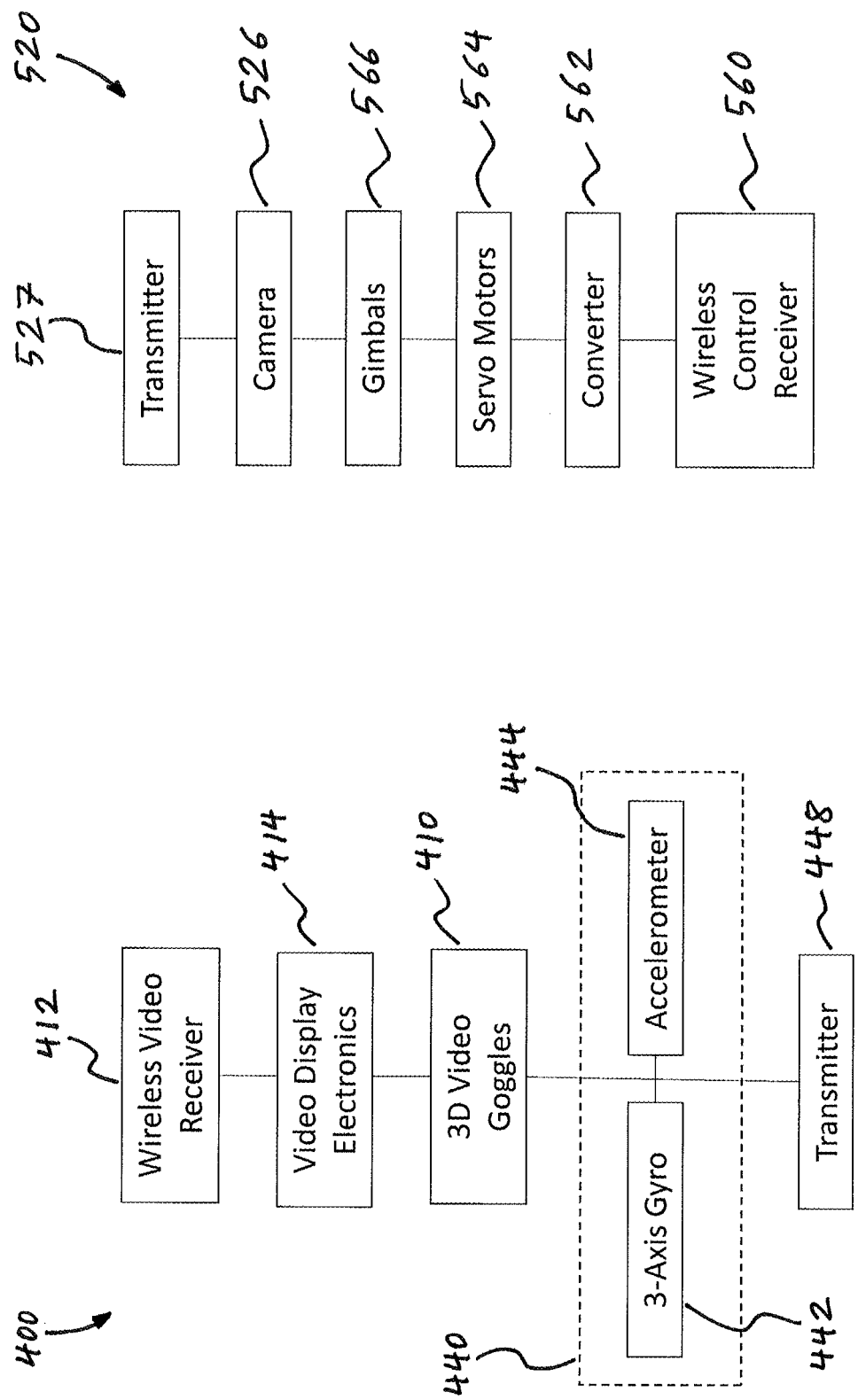
FIG. 9 is a schematic view of an example embodiment of the present invention that includes a head-tracking assembly to control the motion of a camera on the inspection device.

In some embodiments, the control device comprises an immersive video interface that includes 3D video goggles. Referring now to FIG. 9, a schematic view of an example embodiment of the present invention that includes a head-tracking assembly to control the motion of a camera on the inspection device is illustrated. As shown in FIG. 9, in this embodiment, control assembly 400 generally comprises a headset or similar assembly that includes 3D video goggles 410 in communication with a wireless video receiver 412 by way of video display electronics 414. Control assembly 400 generally further comprises head-tracking electronics suite 440, which encompasses at least one 3-axis gyro 442 and at least one accelerometer 444. Head-tracking electronics suite 440 is in communication with head-tracking transmitter 448. In the illustrated example embodiment, inspection device 520 includes, in part, camera 526 and wireless video transmitter 527 in communication with camera 526. Inspection device 520 further comprises wireless control receiver 560, converter 562, servo motors 564, and gimbals 566 attached to camera 526. In operation, video from camera 526 on inspection device 520 is transmitted by wireless video transmitter 527 to wireless video receiver 412. Video received by wireless video receiver 412 is then fed to video display electronics 414, which displays video through 3D video goggles 410 to user who is wearing or otherwise using control assembly 400. Preferably, video from camera 526 displayed through 3D video goggles 410 is accompanied by information from the inspection device 520, preferably information displayed in text form overlaying the video picture. In various embodiments, the information from inspection device 520 is displayed in text form overlaying the video picture and includes telemetry data for the inspection device, the inspection device position, the inspection device speed, the inspection device battery power level, the inspection device battery power usage, the inspection device temperature reading, the ambient temperature, external sensor data, drive component data, and/or storage device thickness sensor data.

Still referring to FIG. 9, as user's head moves while user is wearing/using control assembly 400, the at least one 3-axis gyro 442 and the at least one accelerometer 444 within head-tracking electronics suite 440 measure and/or record the position of user's head in relation to a defined point and/or surface (e.g. the floor of a control room), generating head-tracking data. This head-tracking data is sent by head-tracking transmitter 448 to wireless control receiver 560 on inspection device 520. Head-tracking data received by wireless control receiver 560 is decoded by converter 562 and converted into a camera movement signal, which is sent to servo motors 564, which act upon gimbals 566 attached to camera 526 in order to move camera 526 in response to head-tracking data. In this way, a user may control the movement of camera 526 on inspection device 520 through movement of user's head.

Thus, in some preferred embodiments, a head-tracking goggle assembly for controlling the motion of the camera on the inspection device comprises a wireless video receiver to receive video data recorded by said camera; video display electronics to receive video data from said wireless video receiver and to convert the video data into video pictures; video goggles adapted to be worn by a user and adapted to display video pictures from said video display electronics; head-tracking electronics adapted to detect motion by the head-tracking goggle assembly in response to motion by the user and adapted to generate head-tracking data based on said motion; and a transmitter to transmit head-tracking data to the inspection device. Likewise, in such embodiments, the inspection device includes a wireless control receiver to receive head-tracking data from said head-tracking goggle assembly; a converter adapted to convert said head-tracking data into movement instructions for said camera; and means for moving said camera in response to movement instructions.

The invention also comprises a method for inspecting a storage device. The preferred method comprises providing an inspection device. The preferred inspection device comprises a body that is adapted to receive and retain an item of inspection equipment, one or more wheels that are rotatably mounted to the body, one or more power sources that are adapted to rotate the one or more wheels, and a controller that is adapted to control the movement of the inspection device. The preferred method also comprises controlling the movement of the inspection device relative to the storage device.

Figure 10:
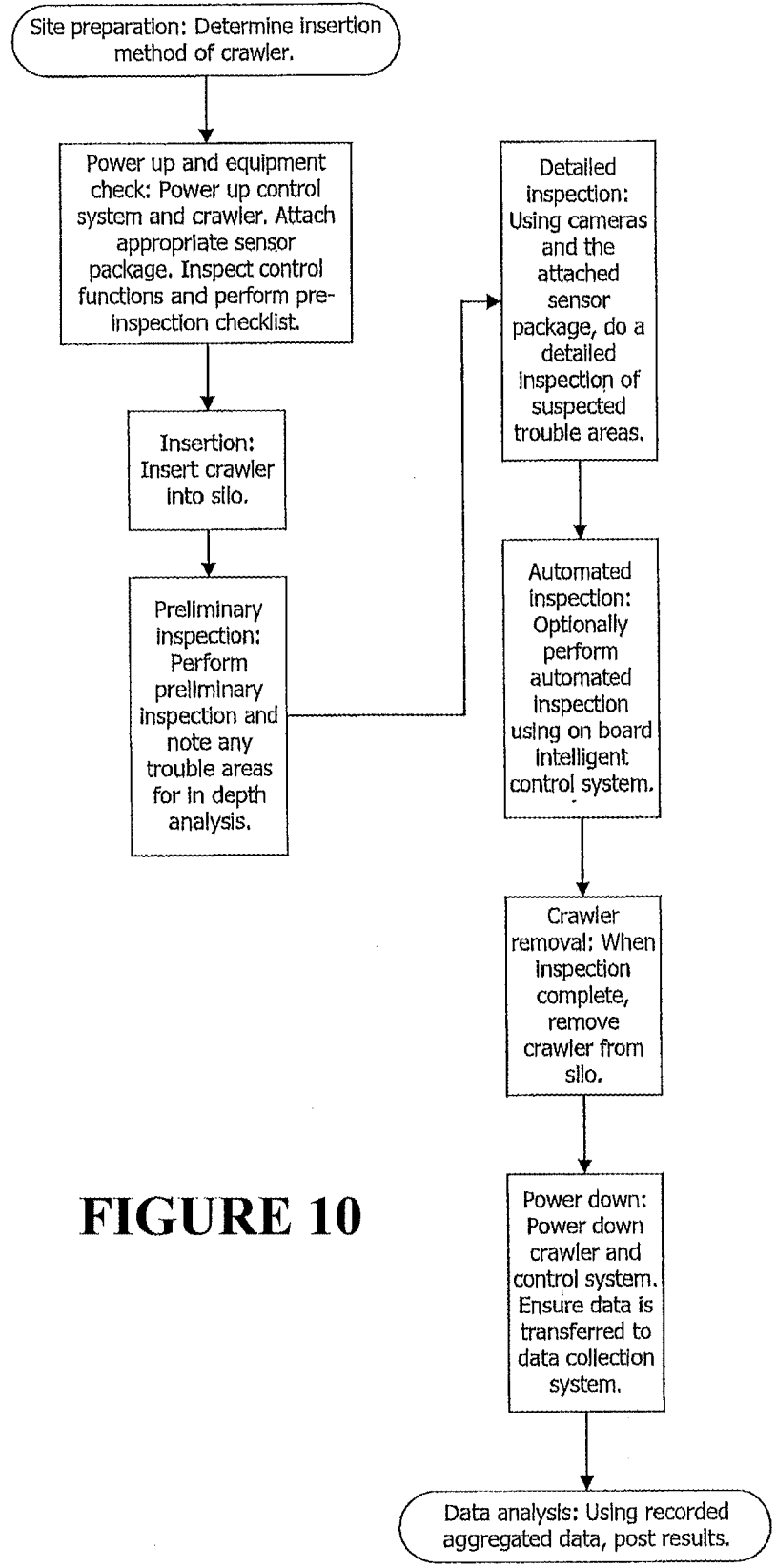
FIG. 10 is a flow chart illustrating a preferred embodiment of the method for inspecting a storage device in accordance with the present invention.

Referring now to FIG. 10, a flow chart outlining a preferred method for inspecting a storage device in accordance with the present invention is illustrated. More particularly, in the preferred methods for inspecting a storage device, the inspection site is initially prepared and the preferred method and location for inserting the inspection device into the storage device is determined. After the inspection site is prepared, the inspection device and the control system are powered up and the appropriate items of inspection equipment are attached to the device. The control functions are inspected and the pre-inspection checklist is reviewed. When the inspection device is ready for operation, it is inserted into the storage device to perform a preliminary inspection in order to identify any trouble areas for a more detailed inspection. The inspection device then performs a detailed inspection of the identified trouble areas using cameras and any other attached item of inspection equipment. The control signals received by the inspection device may originate from a human-controlled wireless 2.4 GHz controller. In the alternative, the inspection device may perform an automated inspection using control signals originating from the on-board autonomous controller or autopilot and sent via packetized serial commands. In either case, the signals are parsed through the on-board motion controllers. When the inspection is complete, the inspection device is removed from the storage device and the data collected by the inspection device is transferred to a data collection system where it can be recorded, aggregated, analyzed, posted, and the like. Preferably, the data collected by the inspection device is wireless transferred to either a ground-based telemetry computer and/or a human wearable video unit containing a heads up display with the information. In addition, the data is preferably recorded for future analysis via a wireless data link and computer interface package. Thereafter, the inspection device and the control system are powered down. While FIG. 10 illustrates a preferred method for inspecting a storage device, it is contemplated within the scope of the invention that the steps of the method may be performed in any suitable sequence.

Figure 11:
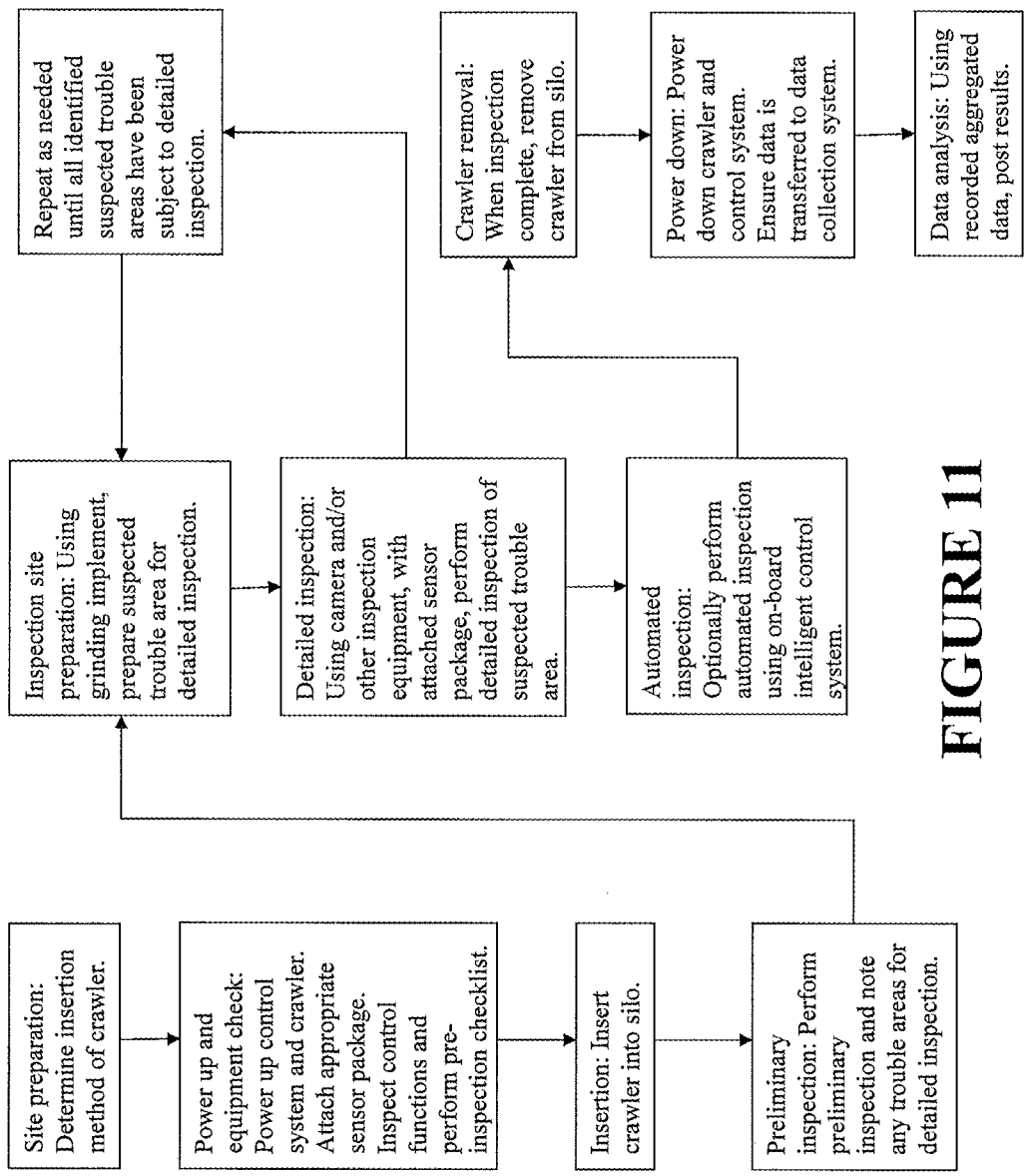
FIG. 11 is a flow chart illustrating a preferred embodiment of the method for inspecting a storage device in accordance with the present invention, incorporating a grinding implement attached to the inspection device.
Figure 13:
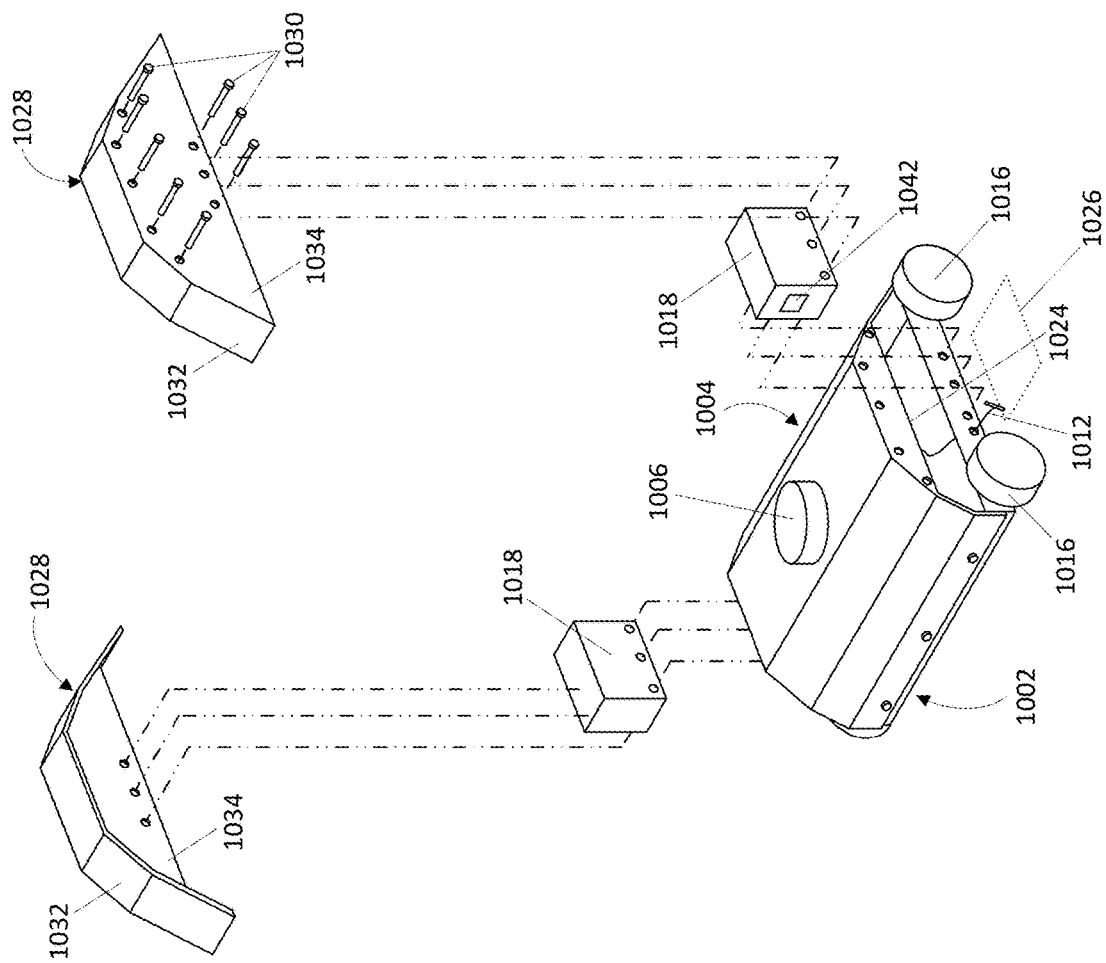
FIG. 13 is a perspective view depicting items of inspection equipment and removable covers being mounted to equipment mounting locations that are located on left and right sides of the tray portion of FIG. 12.

Referring now to FIG. 11, a flow chart outlining a preferred method for inspecting a storage device in accordance with the present invention is illustrated. More particularly, in the preferred methods for inspecting a storage device, the inspection site is initially prepared and the preferred method and location for inserting the inspection device into the storage device is determined. After the inspection site is prepared, the inspection device and the control system are powered up and the appropriate items of inspection equipment are attached to the device. The control functions are inspected and the pre-inspection checklist is reviewed. When the inspection device is ready for operation, it is inserted into the storage device to perform a preliminary inspection in order to identify any suspected trouble areas for a more detailed inspection. Each identified suspected trouble area is prepared by the grinding implement prior to detailed inspection. The inspection device then performs a detailed inspection of the identified trouble areas using cameras and any other attached item of inspection equipment. The control signals received by the inspection device may originate from a human-controlled wireless 2.4 GHz controller. In the alternative, the inspection device may perform an automated inspection using control signals originating from the on-board autonomous controller or autopilot and sent via packetized serial commands. In either case, the signals are parsed through the on-board motion controllers. When the inspection is complete, the inspection device is removed from the storage device and the data collected by the inspection device is transferred to a data collection system where it can be recorded, aggregated, analyzed, posted, and the like. Preferably, the data collected by the inspection device is wireless transferred to either a ground-based telemetry computer and/or a human wearable video unit containing a heads up display with the information. In addition, the data is preferably recorded for future analysis via a wireless data link and computer interface package. Thereafter, the inspection device and the control system are powered down. While FIG. 11 illustrates a preferred method for inspecting a storage device, it is contemplated within the scope of the invention that the steps of the method may be performed in any suitable sequence.

With reference now to FIGS. 12-15, there is provided an inspection device for inspecting storage silos according to an embodiment of the present invention. The inspection device includes a mobile body 1000 having a tray portion 1002 that is preferably controlled remotely by a user. The mobile body 1000 also includes a top portion 1004 that extends over and removably mounts to the tray portion 1002, preferably using mechanical fasteners 1030. The top portion 1004 preferably carries an array of inspection, repair, etc. equipment 1006 (collectively represented in FIG. 12 by a cylinder), such as any of the equipment discussed previously (e.g., lights 24, video camera 26, metal thickness measuring instrument 28, Infrared vision system 29, etc.), for use on or inside of a storage silo.

Figure 12:
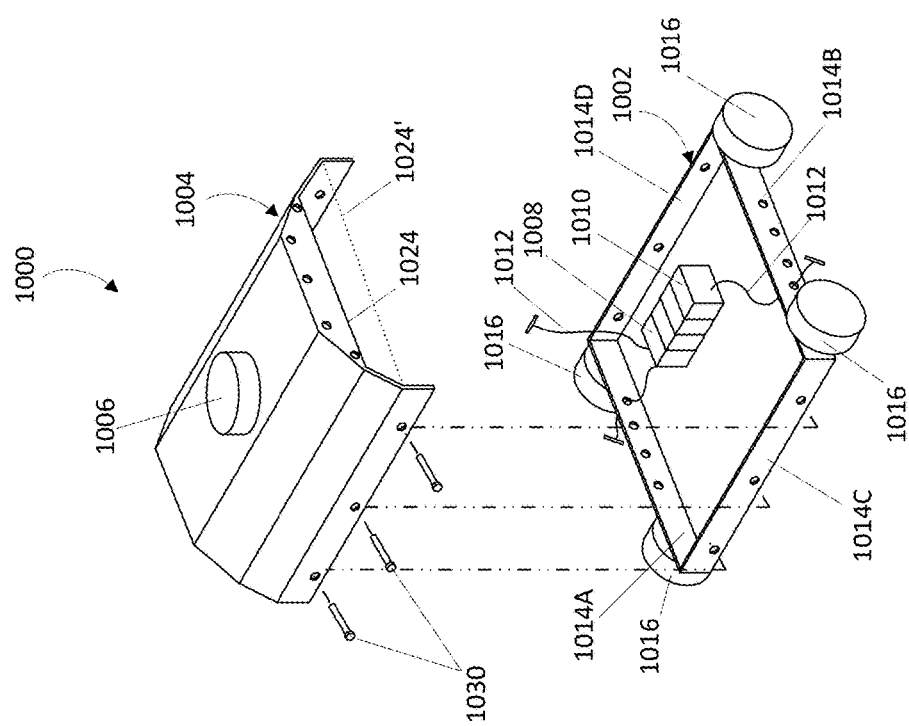
FIG. 12 is a perspective view of a top portion being installed onto a tray portion of an inspection robot according to an embodiment of the present invention.
Figure 17:
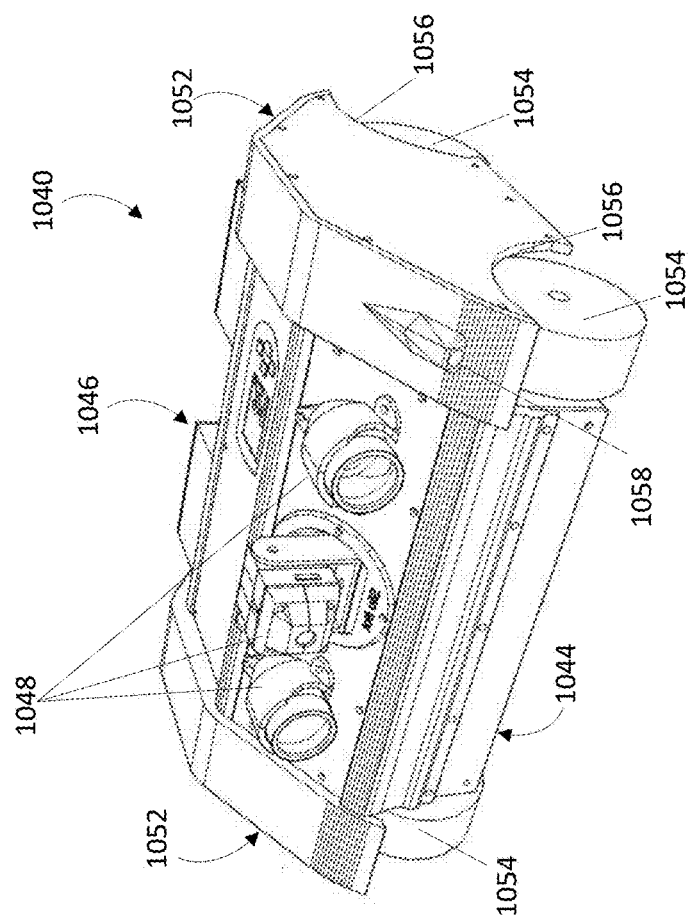
FIG. 17 is a perspective view of the tray portion and top portion of FIG. 16 after being fully assembled.
Figure 16:
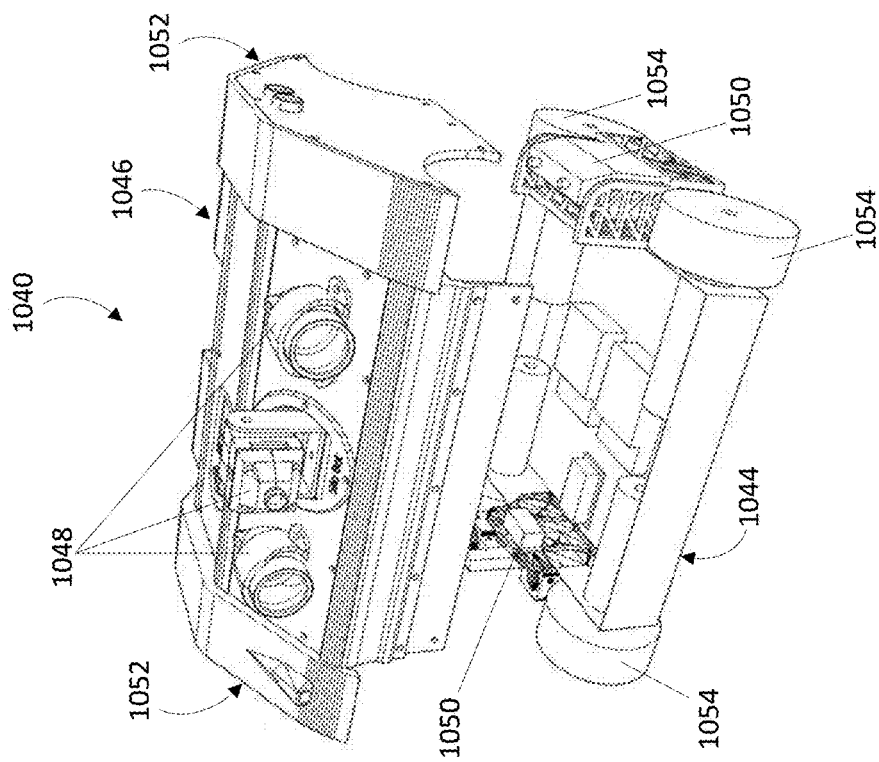
FIG. 16 is a perspective view of a top portion and removable covers being simultaneously installed onto a tray portion of an inspection robot according to an alternative embodiment of the present invention.

Preferably, substantially all of the components needed the move and operate the inspection device, including equipment 1006, are located on or within the mobile body 1000. This might include, for example, a power source 1008 for supplying power to the mobile body 1000 and to the inspection equipment 1006, a control circuit 1010 for at least partially controlling movement of the mobile body and operating inspection equipment, and a wiring harness 1012 for forming an electrical circuit that includes the inspection equipment, the control circuit, and the power source. More preferably, as shown in FIG. 12, all such components are located on or within the tray portion 1002, such that the top portion 1004 could be removed completely and the tray portion 1002 could still move. However, in other embodiments, some or all of the above-described components are provided in the bottom tray portion 1002. The tray portion 1002 is preferably enclosed by a side wall having left 1014A, right 1014B, front 1014C and back 1014D vertical surfaces and an open top for enabling internal components to be easily lowered down into the bottom of the tray portion.

The mobile body 1000 is designed such that modular top portions 1004 having different tools or instruments could be used in conjunction with the same tray portion 1002. This would enable the purpose of the mobile body 1000 to be quickly changed in field by simply swapping one top portion 1004 and its tool selection for another top portion with a different tool selection. Alternatively, the mobile body 1000 may be configured such that the equipment 1006 may be removed and replaced with another item of equipment without removing the top portion 1004 by simply disconnecting the equipment 1006 from the top portion. In either case, equipment 1006 may be quickly swapped without impacting the mobile body's 1000 ability to move and operate.

Pairs of spaced apart in-line (i.e., parallel with one another) drive wheels 1016 are located on an exterior face of the left and right vertical surfaces 1014A, 1014B of the tray portion 1002. As stated earlier, these wheels 1016 are preferably magnetic such that the mobile body 1000 may scale magnetic surfaces, such as a storage silo. To enable precise movement and positioning of the mobile body 1000, each of the drive wheels 1016 is preferably independently rotated and controlled by a controller that is separate from each other wheel controller.

In addition or as an alternative to mounting equipment to the top portion 1004, as discussed above, the same equipment or different equipment 1018 may be mounted to the outside of the tray portion 1004. For example, in certain preferred embodiments, an equipment mounting location may be provided in a space 1026 located between at least one of the pairs of drive wheels 1016. The dashed lines for space 1026 indicate where equipment 1018 would be positioned when mounted to the tray portion 1002 at the mounting location. Preferably, the equipment mounting location space 1026 is sized and configured to allow at least two non-identical items of inspection equipment 1018 to be interchangeably and removably mounted to the mobile body 1000 and to be accessed outside the tray portion 1002. In those cases, harness 1012 is preferably a universal wiring harness that is configured to interchangeably connect with each of the non-identical items of inspection equipment. To facilitate connecting and disconnecting equipment 1018 to and from wiring harness 1012 without requiring top portion 1004 to be removed from tray portion 1002, the wiring harness preferably extends out of an opening 1020 formed in the left or right vertical surfaces 1014A, 1014B (or front or back vertical surfaces 1014C, 1014D if equipment is located on those faces) of the tray portion. A similar opening may be provided in top portion 1004 for quickly connecting equipment 1006 to wiring harness 1012. The end of the wiring harness 1020 is preferably connected to a universal interface 1042 located on the equipment 1006, 1018.

In this case, primarily for illustration purposes, a side surface 1022 of the top portion 1004 has a lower edge 1024 that is spaced apart from the top of the left or right vertical surfaces 1014A, 1014B. More preferably, to better seal the mobile body 1000 and protect the various components inside it, lower edge 1024' is positioned such that the sides 1022 of top portion 1004 rest directly on the left and right vertical surfaces 1014A, 1014B of the tray portion 1002.

Similarly, to better protect equipment 1018 mounted to the left and right vertical surfaces 1014A, 1014B of the tray portion 1002, optional fenders 1028 having a top surface 1032 joined to a side surface 1034 may be provided as a cover. The fenders 1028 are preferably removably mounted to the left and right vertical surfaces 1014A, 1014B of the tray portion 1002 by mechanical fasteners 1030. The fenders 1028 are arranged such that the top surface 1032 extends laterally outwards from the left and right sides of the top portion 1004 of the mobile body 1000 and beyond the equipment 1018 mounted to the tray portion 1002. Next, the side surface 1034 extends downwards and preferably beyond (i.e., lower) than the equipment 1018. In this way, the equipment 1018 is substantially enclosed within a space formed between the fender 1028 and the mobile body 1000. In certain preferred embodiments, to provide a more secure connection between the fender 1028 and the mobile body 1000, the fender 1028 is secured to the top portion 1004 and to the equipment 1018 or tray portion 1002 by fasteners 1030.

To support the desired modular nature of the mobile body 1000, in preferred embodiments, the fender 1028 and the equipment 1018 may be removed from the mobile body as a unit and without removing the top portion 1004 from the tray portion 1002. This would allow, for example, equipment already equipped with a protective fender to be swapped for another piece of equipment having a protective fender without impacting the operability of the mobile body. Additionally or alternatively, the fender 1028, the top portion 1004, and the equipment 1018 may be removed, as a single unit, from the tray portion 1002 for the same reasons as discussed above.

Referring now to FIGS. 16-21, there is provided an inspection device for inspecting storage silos according to an alternative embodiment of the present invention. Inspection device includes a mobile body 1040 that is structurally similar to mobile body 1000 discussed above, including a moveable tray portion 1044 and a top portion 1046 that extends over and removably mounts to the tray portion. An array of inspection, repair, etc. equipment is mounted to the top portion 1046. This equipment preferably remains fixed to the top portion 1046 when the top portion is removed from the tray portion 1044, but may be removed when necessary (e.g., during repairs). In this particular embodiment, the equipment includes lights 24 and video camera 26. On the other hand, equipment 1050 (FIG. 16) mounted to the sides of the tray portion 1044 are preferably quickly replaced with the same or different items of equipment, as discussed previously, through the use of a universal wiring harness. Even more preferably equipment 1050 may be removed from tray portion 1044 without requiring the top portion 1046 to be removed.

Figure 20:
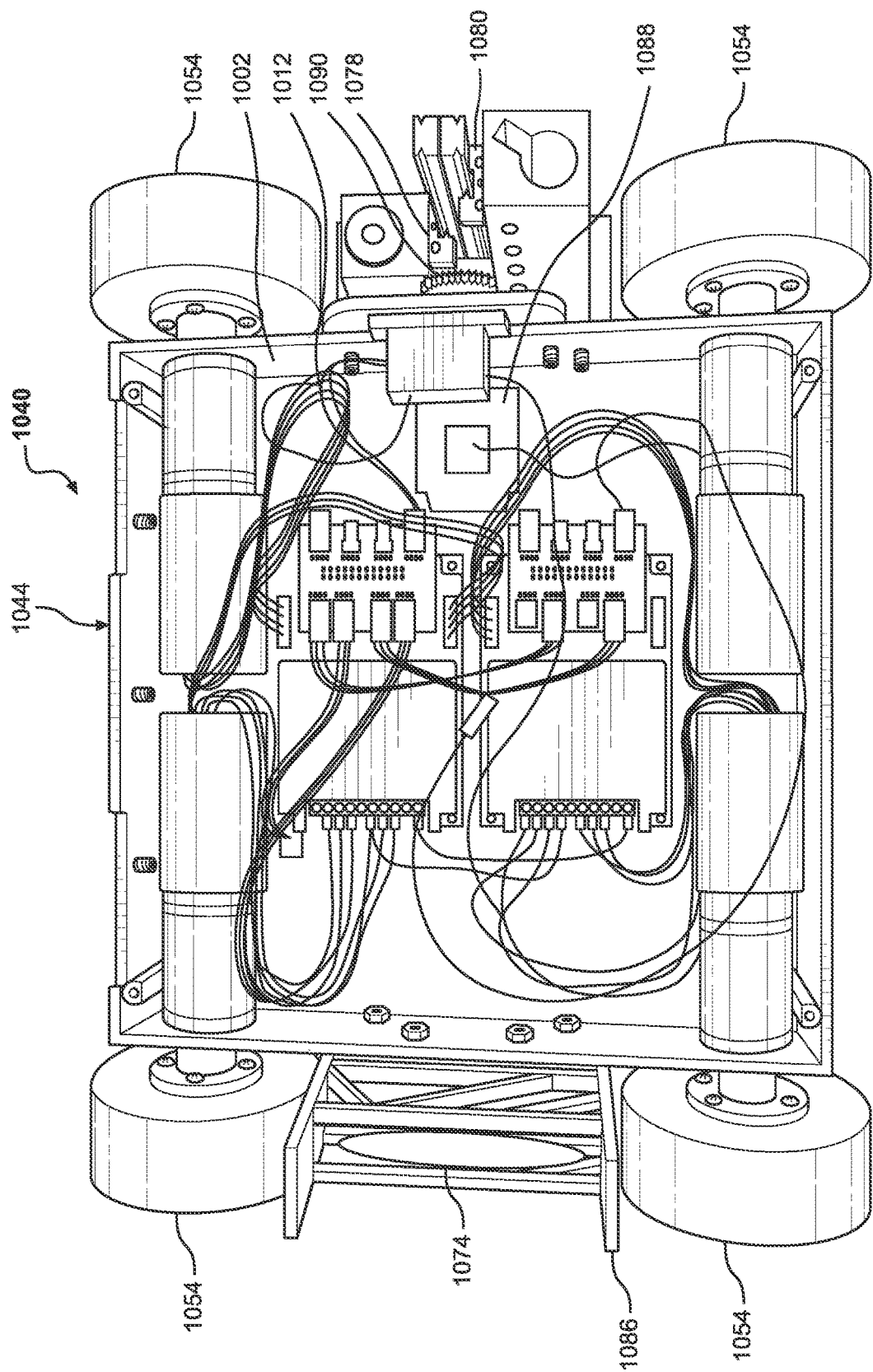
FIG. 20 is a top plan view of the tray portion depicted in FIG. 16.
Figure 21:
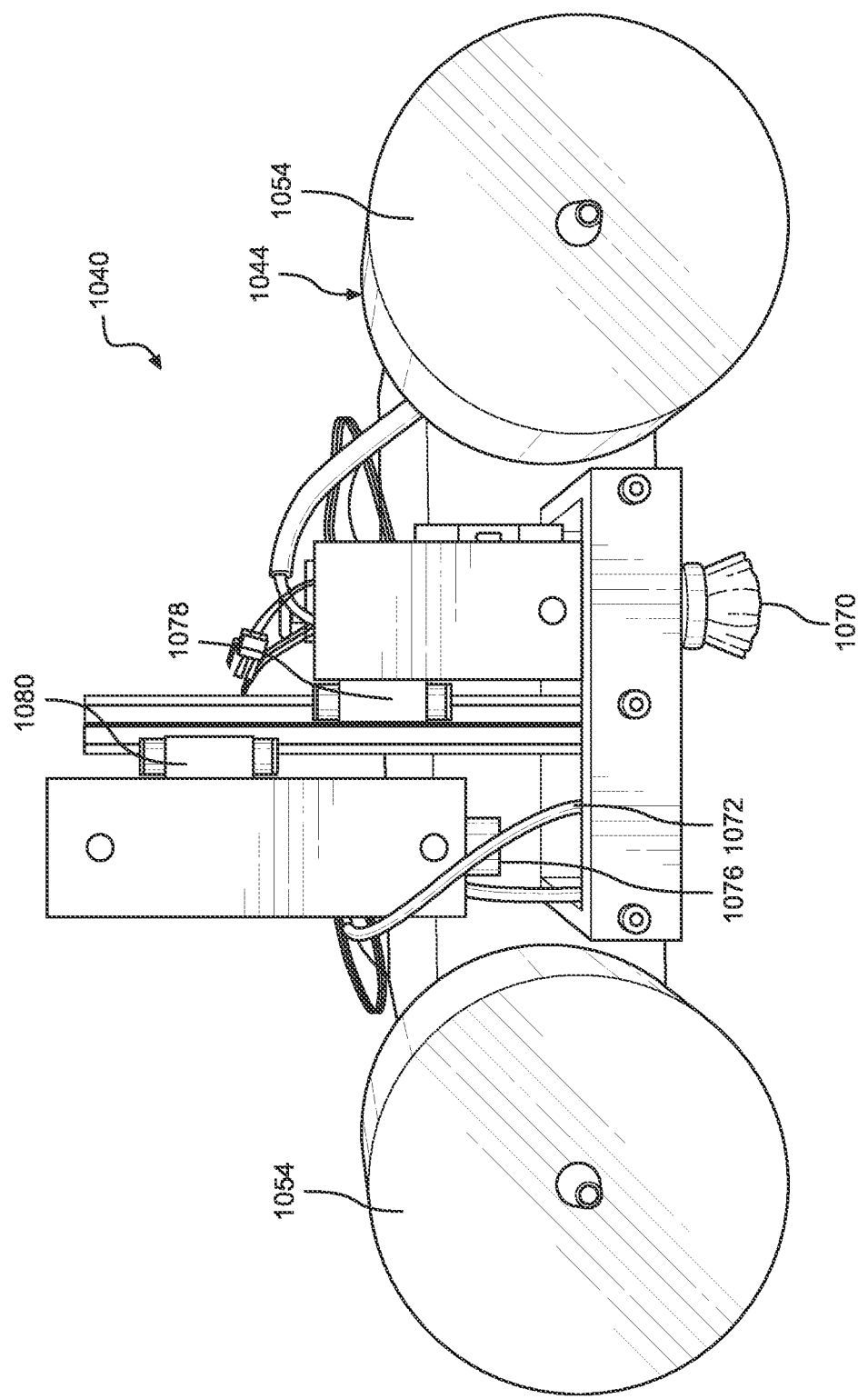
FIG. 21 is a left side elevation view of the tray portion of FIG. 16 showing removably-mounted equipment mounted between a pair of external drive wheels.

As shown best in FIGS. 20 and 21, in this particular embodiment, equipment mounted to exterior of the tray portion includes an abrading instrument 1070 for abrading a portion of a surface to be inspected ("inspection surface"), a coolant ejector 1072 for ejecting a coolant, a coolant supply 1074 for supplying coolant gel to the coolant ejector, and a metal thickness sensor 1076. The abrading instrument 1070 in this case is a rotating wire brush attached to an actuator 1078 that lowers the brush onto the inspection surface and raises the brush away from the inspection surface. Once any required abrading of the inspection surface has been carried out, the mobile body 1040 moves forwards in order to align the coolant ejector 1072 with the abraded portion of the inspection surface and the coolant ejector deposits coolant onto the inspection surface. The coolant is provided from the coolant supply 1074. In this case, coolant supply 1074 is a gel-filled bag that is connected via hoses 1082 to a pump 1084 (FIG. 19) and that has a terminal end located adjacent the abrading instrument 1070. Preferably the terminal end is located such that the coolant is deposited directly below sensor 1076. Once the mobile body 1040 has been located such that the sensor 1076 is located above the deposited coolant, a second actuator 1080 lowers the sensor down onto the coolant and inspection surface and takes a reading. In certain embodiments, the actuators 1078, 1080 are interconnected by common gearing 1090, such that one actuator is raised at the same time that the other is lowered.

In this case, the abrading instrument 1070, coolant ejector 1072, and metal thickness sensor 1076 are all mounted to the mobile body 1040 at a first equipment mounting location that is located in a space between pairs of drive wheels 1054. The coolant supply 1074 is located in a second equipment mounting location on the opposite side of the mobile body. In this case, a basket 1086 is mounted at the second equipment mounting location such that the gel-filled bag may be easily removed when empty and replaced. Additionally, a camera 1088 may be mounted to and extend through a bottom of the tray portion. The camera 1088 is preferably directed towards instrument 1070, ejector 1072 and sensor 1076 so that a user can inspect work as it takes place at the inspection surface.

In this case, the abrading instrument 1070, couplant ejector 1072, and metal thickness sensor 1076 are all mounted to the mobile body 1040 at a first equipment mounting location that is located in a space between pairs of drive wheels 1054. The couplant supply 1074 is located in a second equipment mounting location on the opposite side of the mobile body. In this case, a basket 1086 is mounted at the second equipment mounting location such that the gel-filled bag may be easily removed when empty and replaced. Additionally, a camera 1088 may be mounted to and extend through a bottom of the tray portion. The camera 1088 is preferably directed towards instrument 1070, ejector 1072 and sensor 1076 so that a user can inspect work as it takes place at the inspection surface.

The above description is give as a single example of the type of equipment that can be mounted to the mobile body 1040 in the external equipment mounting locations between the wheels 1054. The modular design of mobile body 1040 enables the equipment discussed above to be quickly and easily swapped for similar equipment that uses a similar form factor. In each instance, the equipment may be swapped without removing the top portion 1046 of the mobile body from the tray portion 1044. This allows for the equipment swapping process to occur more easily and quickly.

To protect equipment 1050 mounted to the mobile body 1040, fenders 1052 may be mounted to the sides of the top portion 1046 and tray portion 1044. The fenders 1052 extend laterally outwards from the top portion 1046 beyond drive wheels 1054 and the equipment 1050 and then downwards. Wheel cutouts 1056 (FIG. 17) may be formed in the fenders 1052 to expose a portion of the wheels 1054 to facilitate replacing the wheels and to enable the wheels to rotate freely. Additional equipment 1058, such as task lights, guide laser, etc., may also be located on the fenders 1052.

Figure 18:
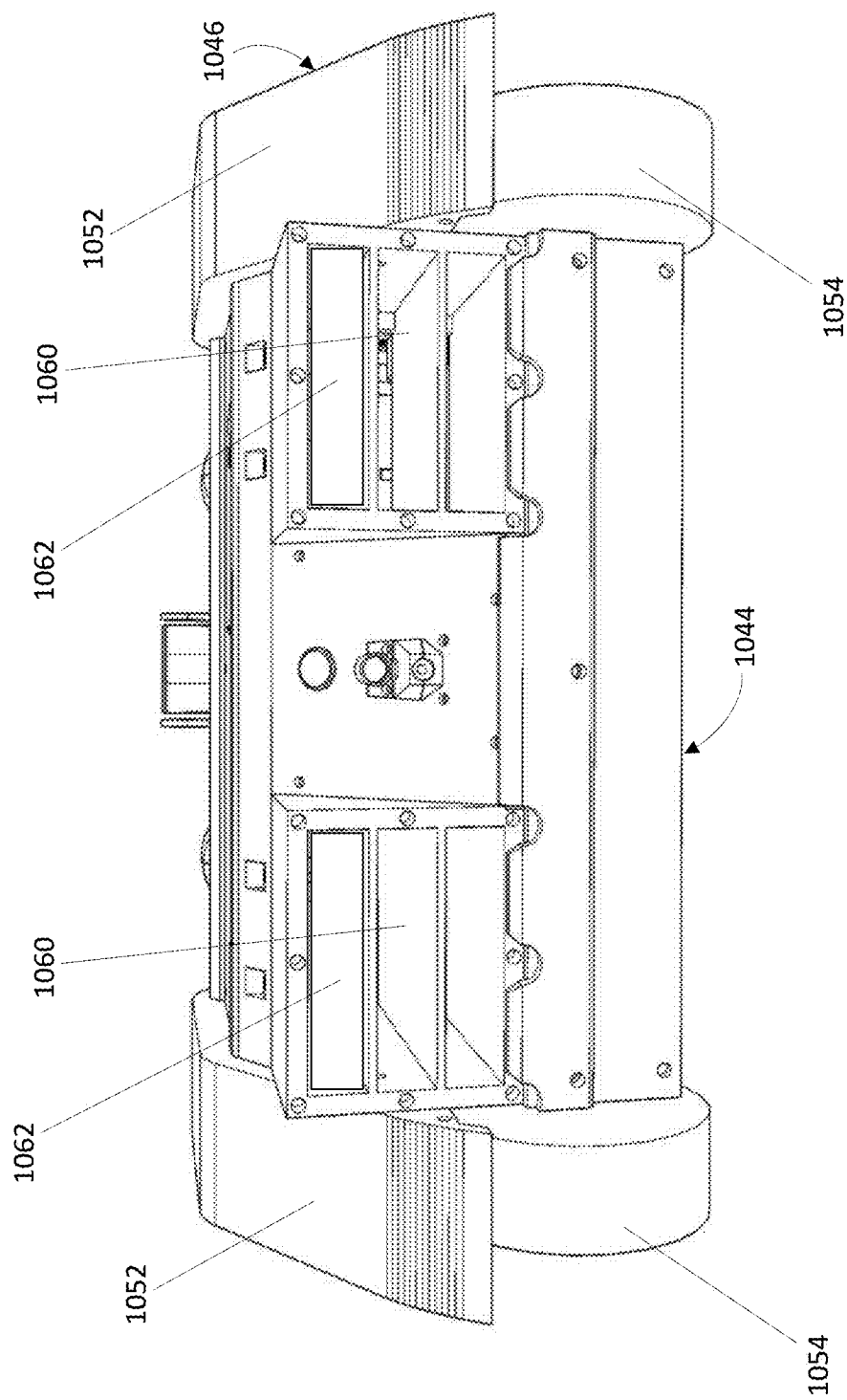
FIG. 18 is a rear elevation view of the top portion of FIG. 16 having a plurality of bays for receiving removable and hot swappable power sources and instrumentation.
Figure 19:
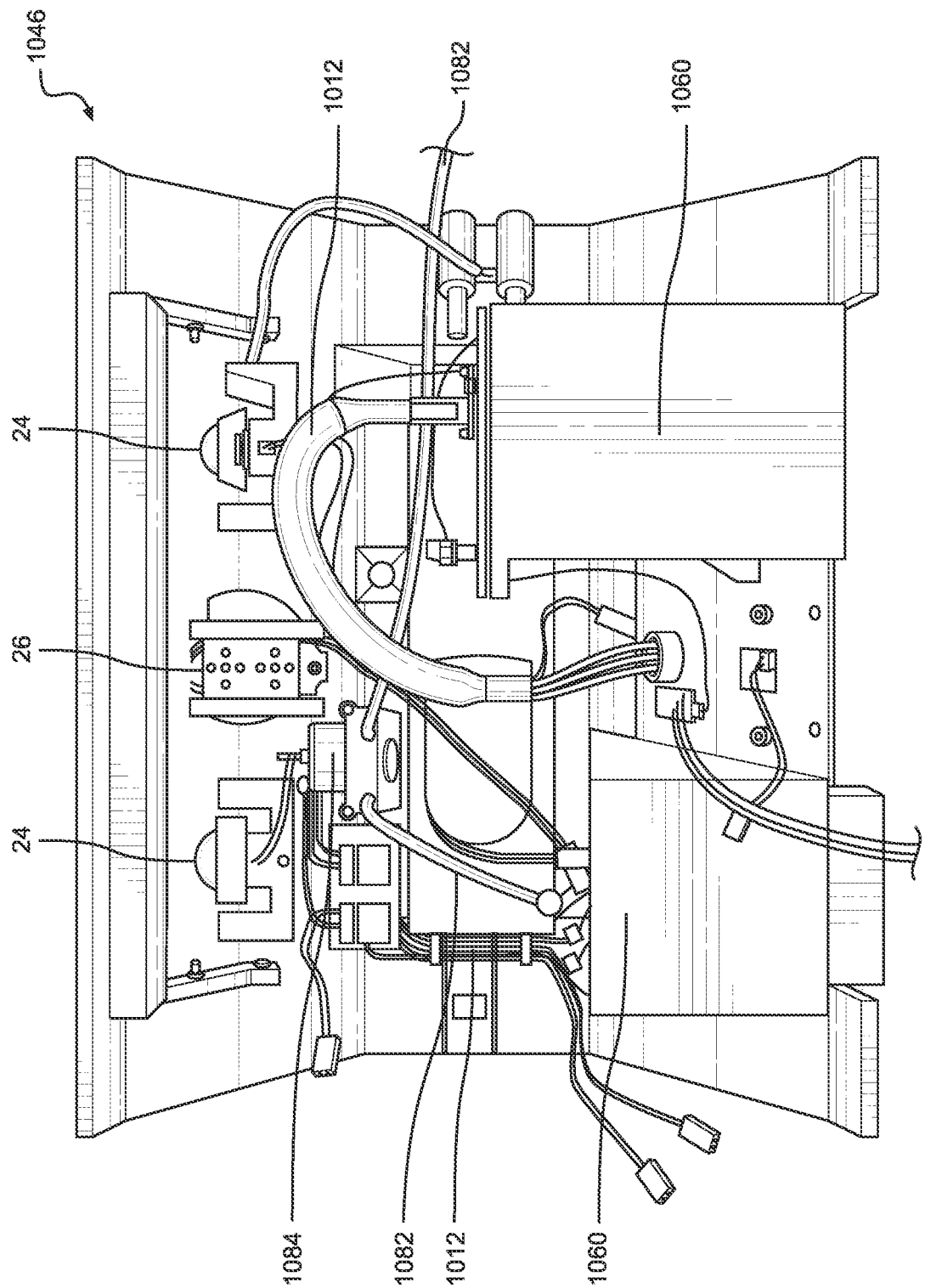
FIG. 19 is a bottom plan view of the top portion depicted in FIG. 16.

As shown in FIG. 18, the top portion 1046 may also include one or more equipment bays 1060 configured to receive a hot swappable piece of equipment 1062. The equipment 1062 may be, for example, a power supply for powering the inspection device, backup power supplies, communications or navigation plugins, etc. Preferably, inserting the equipment 1062 fully into the bay 1060 automatically connects the equipment to a circuit appropriate for that particular type of equipment. For example, if the equipment 1062 is a navigations plugin, inserting the equipment fully into the bay 1060 automatically connects the equipment to the control circuit for controlling the inspection device. Likewise, if the equipment 1062 is a battery, inserting the equipment fully into the bay 1060 automatically connects the battery to an electrical circuit for powering the inspection device and related equipment.

Figure 22:
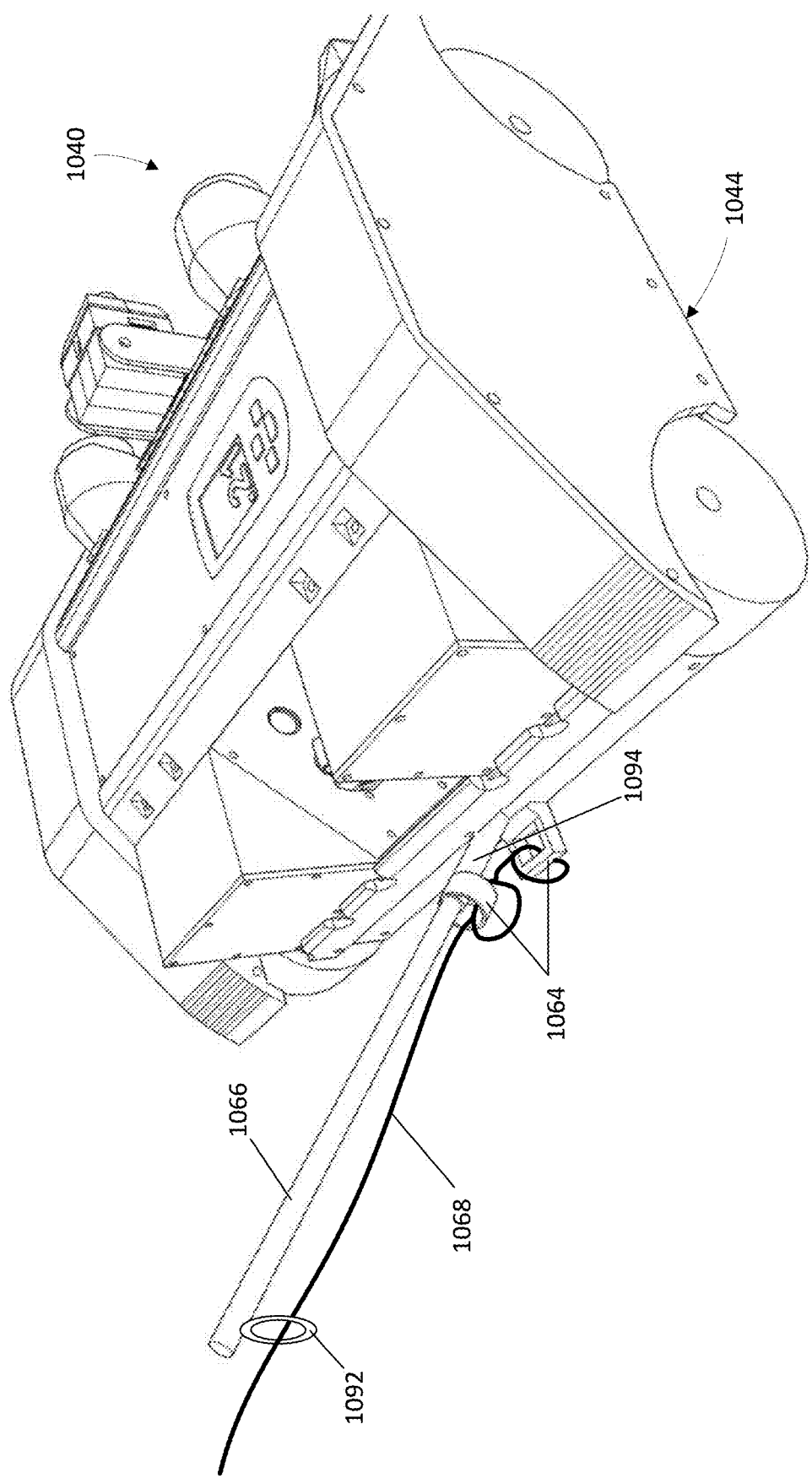
FIGS. 22 and 23 are top perspective views of a mobile inspection device having a tether connection and rigid tether guide according to an embodiment of the present invention.
Figure 23:
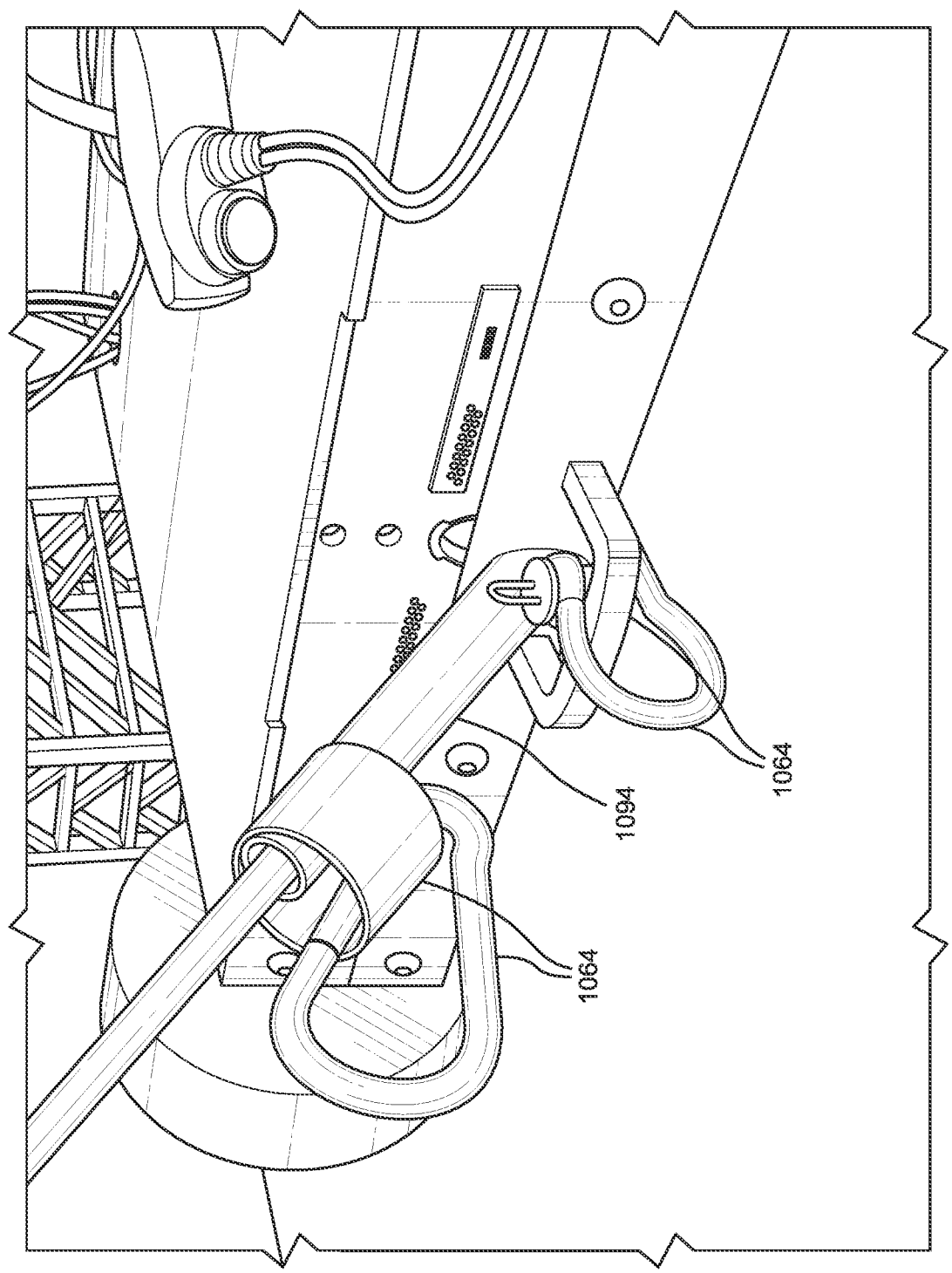

Now, with reference to FIGS. 22 and 23, certain preferred embodiments of the mobile body 1040 may be provided with a tether connection 1064 and a tether guide 1066 for connecting a safety tether 1068 to the mobile body and for guiding the safety tether safely away from the mobile body. The safety tether 1068 is provided as a safety feature that is used to catch the inspection device in the event it were to become disengaged from the inspection surface (e.g. the inner wall of a storage silo) and fall. This might occur, for example, during power failure. The safety tether 1068 also provides a convenient means for raising and lower the inspection device. This is particularly useful, for example, when the inspection device must be raised overhead. By attaching the tether to a crane or overhead pulley, the inspection device can be safely raised and lowered to the desired location.

In this particular case, the tether connection 1064 includes a pair of rigid rings or hoops having carabiners attached to them. Preferably, a pair of tether connection points 1064 are provided in order to reduce the overall load acting on a single connection point and to provide redundancy in the event that one connection point should fail. The tether 1068 is a rope, cable, etc. having sufficient tensile strength to safely lift the inspection device. A pair of loops is provided in the cable that corresponds to the pair of tether connection points 1064. The tether guide 1066 is provided to guide the tether 1068 safely away from the inspection device and to reduce the possibility that the tether comes into contact and entangled with the inspection device. This particular case, the elongate tether guide 1066 is formed from a rigid but flexible material, such as fiberglass. It may include an additional eye 1092 that the tether 1068 passes through as it travels from the overhead crane/pulley to the tether connections 1064. In preferred embodiments, the tether guide 1066 is removably mounted inspection device and may be quickly and easily removed as needed. In this particular case, one of the tether connections 1064 is mounted at an end of a hollow tube 1094. The opposite end of that hollow tube 1094 is mounted to the tray portion 1044 of the inspection device. The opening of the tube 1094 is sized to allow the end of the tether guide 1066 to be inserted into it.

In operation, several advantages of the preferred embodiments of the inspection device are achieved. For example, the preferred embodiments of the invention described and claimed herein are adapted to provide an apparatus and method for an inspection device that does not require an inspector to be at the site of the inspection. The preferred embodiments of the invention described and claimed herein are also adapted to provide an apparatus and method for an inspection device that does not require scaffolding or other similar equipment. The preferred embodiments of the invention described and claimed herein are further adapted to provide an apparatus and method for an inspection device that is less expensive, labor-intensive, and time-consuming. The preferred embodiments of the invention described and claimed herein are still further adapted to provide an apparatus and method for an inspection device that reduces or eliminates safety risks to the inspector. In addition, the preferred embodiments of the invention described and claimed herein are adapted to provide an apparatus and method for an inspection device that reduces the required amount of training and produces improved inspection results. Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. An inspection device for inspecting storage silos comprising:

a mobile body having a tray portion;

an equipment mounting location disposed on an exterior surface of the mobile body and sized and configured to enable an item of inspection equipment to be removably mounted to the mobile body and accessed and exchanged with another item of inspection equipment from outside the mobile body;

a power source located within the mobile body for supplying power to the mobile body and to the item of inspection equipment mounted to the equipment mounting location;

a control circuit located within the mobile body for at least partially controlling movement of the mobile body and operating the item of inspection equipment; and a wiring harness located within the tray portion configured to connect with the item of inspection equipment and operable to form an electrical circuit comprising the item of inspection equipment mounted to the mobile body at the equipment mounting location, the control circuit, and the power source.

2. The inspection device of claim 1 wherein the mobile body may be controlled remotely.

3. The inspection device of claim 1 wherein the equipment mounting location is configured to allow at least two non-identical items of inspection equipment to be interchangeably and removably mounted to the mobile body.

4. The inspection device of claim 3 comprising a universal wiring harness configured to interchangeably connect with each of the least two non-identical items of inspection equipment.

5. The inspection device of claim 1 further comprising pairs of spaced apart in-line drive wheels disposed on left and right sides of the tray portion.

6. The inspection device of claim 5 comprising an equipment mounting location provided in a space located between each pair of in-line drive wheels.

7. The inspection device of claim 6 further comprising:
an abrading instrument for abrading a portion of a surface to be inspected;
a coolant ejector for ejecting a coolant onto the portion of the said surface to be inspected;
a metal thickness sensor for contacting the coolant and determining the thickness of the portion of said surface to be inspected; and
a coolant supply configured to supply coolant to the coolant ejector,
wherein the abrading instrument, coolant ejector, and metal thickness sensor are all disposed in one of said equipment mounting locations and the coolant supply is disposed in the other of said equipment mounting locations.

8. The inspection device of claim 1 further comprising a side wall forming an enclosure for the tray portion having left, right, front and back vertical surfaces and an open top, wherein the equipment mounting location is located on the left vertical surface or the right vertical surface.

9. The inspection device of claim 1 further comprising a top portion configured to removably mount to and to extend over the tray portion.

10. The inspection device of claim 9 further comprising one or more equipment bays formed in the top portion, each equipment bay configured to receive a hot swappable piece of equipment.

11. The inspection device of claim 10 wherein the hot swappable piece of equipment is a power source.

12. The inspection device of claim 9 further comprising a fender configured to removably mount to and to extend laterally outwards from a left side or a right side of the top portion and over the inspection equipment mounted to the tray portion at the equipment mounting location.

13. The inspection device of claim 12 wherein the fender is configured to removably mount to the equipment mounted to the tray portion at the equipment mounting location.

14. The inspection device of claim 12 further comprising:
pairs of spaced apart in-line drive wheels disposed on left and right sides of the body portion;
wheel cutouts formed in the fender that are located proximate to and are approximately equal in size to the drive wheels.

15. The inspection device of claim 12 wherein the fender and the equipment mounted to the tray portion at the equipment mounting location may be removed as a unit without removing the top portion from the tray portion.

16. The inspection device of claim 12 wherein the fender, the top portion, and the equipment may be removed, as a single unit, from the tray portion.

17. The inspection device of claim 12 wherein the fender and the equipment mounted to the tray portion at the equipment mounting location may be removed, as a single unit, from the top portion and the tray portion.

18. The inspection device of claim 1 further comprising a tether connection disposed on an exterior of the inspection device and configured to removably receive a flexible tether for raising and lowering the inspection device.

19. The inspection device of claim 18 wherein the tether connection comprises a pair of spaced apart eyes for connecting to a corresponding pair of spaced apart eyes disposed on said tether.

20. The inspection device of claim 18 further comprising an elongate substantially rigid tether guide extending from an exterior of the inspection device and configured to guide the flexible tether to the tether connection.

* * * * *